Oct. 25, 1932.  J. R. McWANE  1,884,063
PIPE JOINT
Filed Feb. 20, 1929    2 Sheets-Sheet 1

INVENTOR
James R. McWane,
BY
Siggers & Adams
ATTORNEYS

Oct. 25, 1932.  J. R. McWANE  1,884,063
PIPE JOINT
Filed Feb. 20, 1929  2 Sheets-Sheet 2
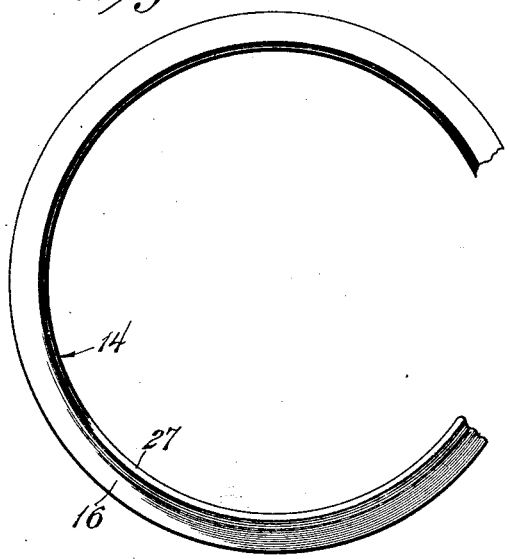
Fig.3
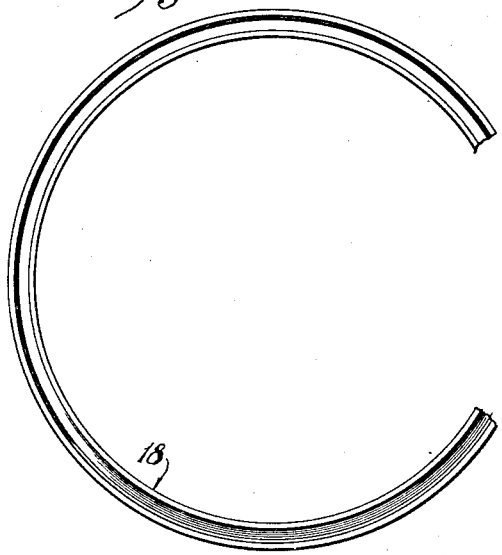
Fig.5
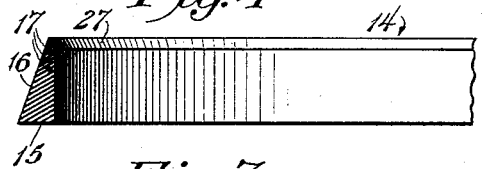
Fig.4
Fig.6
Fig.7
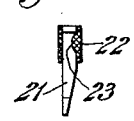
Fig.8
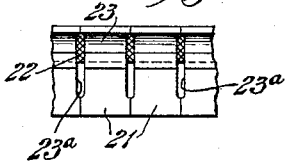
Fig.9
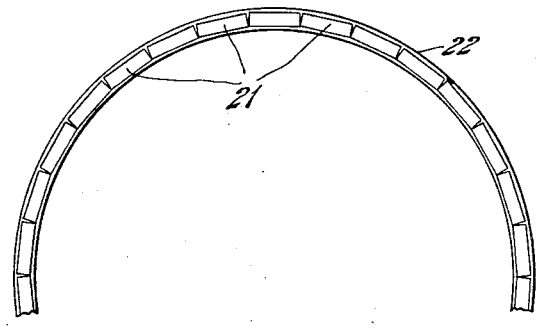
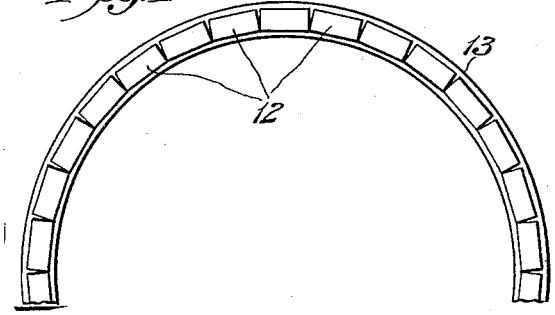
Fig.10
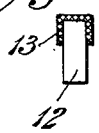
Fig.11
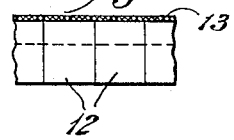
Fig.12
INVENTOR
James R. McWane,
BY
Siggers & Adams
ATTORNEYS Patented Oct. 25, 1932

1,884,063

UNITED STATES PATENT OFFICE

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA

PIPE JOINT

Application filed February 20, 1929. Serial No. 341,406.

This invention relates to pipe joints, and among other objects, aims to provide a pipe joint particularly adapted for gas lines, which may be made up as a prepared or factory-made joint by the pipe manufacturer, which will hold gas under high pressure without leakage, and which will permit a relatively large movement of the pipe sections (either lateral deflection or longitudinal movement), without leakage.

It will be understood that the term "gas" is used generically in this specification, and hence when I say "gas" I mean air and other gases, natural and artificial.

In the accompanying drawings,—

Fig. 3 is a fragmentary elevation of one of the gaskets;

Fig. 4 is a sectional elevation of the gasket of Fig. 3;

Fig. 5 is a fragmentary elevation of the other gasket;

Fig. 6 is a sectional elevation of the gasket of Fig. 5;

Fig. 7 is a fragmentary end elevation of one of the wedge rings;

Fig. 8 is a cross-section through one side of the wedge ring of Fig. 7;

Fig. 9 is a detail of the wedge ring of Fig. 7, showing particularly the shape of the wedges;

Fig. 10 is a fragmentary end elevation of the other wedge ring;

Fig. 11 is a cross-section through one side of the wedge ring of Fig. 10; and

Fig. 12 is a detail showing several of the wedges of Fig. 10 in plan.

Figure 1:
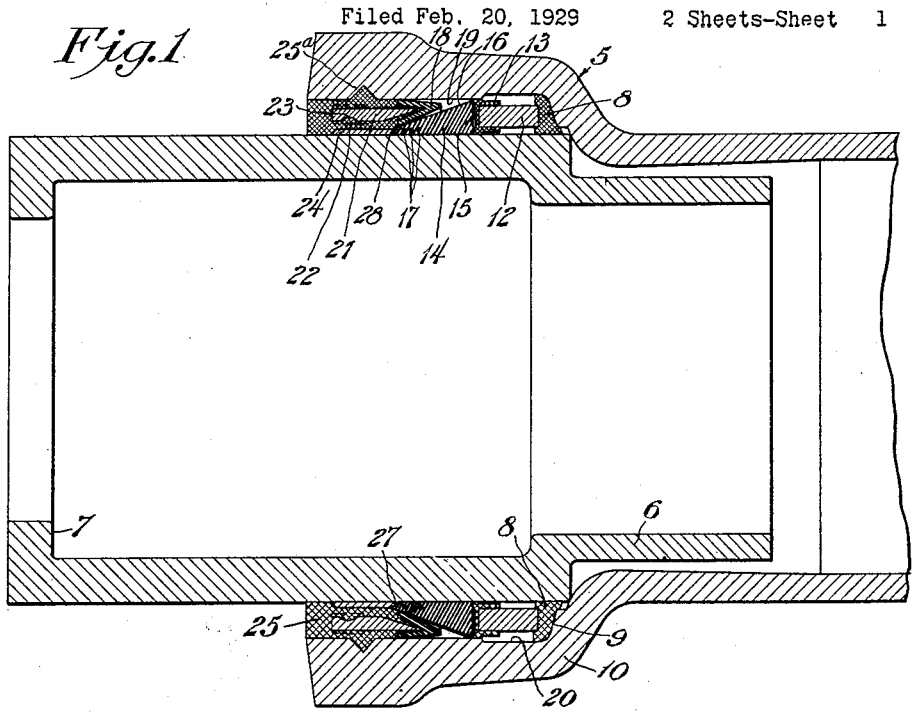
Fig. 1 is a diametric section of the bell end of a pipe, with a mandrel therein, showing the joint materials after assembly.

In the making of pipe joints, rubber gaskets of various designs have been employed, particularly on joints for conveying gas and air. Two outstanding types of such joints are in use. One is the usual type of bell and spigot where the gasket is inserted in the bell around the spigot and subsequently compressed by calking. Gaskets used in this way are either square or round or V-shaped.

There are two objections to such joints: one is the difficulty of properly compressing the rubber, resulting in excessive calking, and the other difficulty is the fact that any movement of the spigot due to expansion and contraction is likely to disturb the gasket and lead to leakage.

The other type of joint employing the rubber gasket is what is called the "bolted gland joint". In this case, a specially designed bell is used which will receve a rubber gasket of the proper shape, which is tightened against the spigot by a gland around the spigot being bolted tight against the rubber. The two principal objections to this, in addition to the expense, are, first, the danger of the bolts rusting out in the course of time, and, second, the exposure of the rubber around the gland to the action of air and moisture which limits the effective life of the rubber.

Referring particularly to the drawings, there is shown the bell 5 of a bell and spigot pipe in which a mandrel 6 is placed so that an annular space is left between the outer wall of the mandrel and the inside of the bell, for insertion of the joint materials. As shown, the mandrel is so shaped as to be automatically centered with respect to the bell, thus insuring uniform packing of the joint, and is provided with an inwardly extending flange 7 at the outer end, facilitating withdrawal when the joint materials are in place.

In making the joint, the mandrel 6 is inserted first, and then a packing ring 8, preferably of lead, is pushed in until it comes in contact with a beveled surface 9 on the shoulder 10, of the bell. To provide clearance, the outside diameter of the mandrel is very slightly larger than the spigot 11, which is inserted later, when the pipe lengths are assembled in the field. So as to hold the lead ring 8 in place and provide means for automatically tightening the joint in case of deflection of the pipe sections, a preformed ring made up of a series of wedges 12 shown as being made of metal and flexibly held together by a lead holder 13, may be used. The preformed ring may be generally similar to the one shown in my Patent No. 1,486,777, both in construction and in function, and is forced against the lead ring 8 by means of a calking tool, preferably so that the ends of the wedges are actually embedded in the lead ring 8 sealing the bottom of the bell, while the annular lead holder 13 is spread laterally by calking to fill the space between the mandrel and the bell, thus providing a second seal against the gas to be conducted by the pipe, ring 8 providing the primary seal.

Next to the wedge ring there is placed a rubber gasket 14 in the form of a ring having a generally triangular cross-section. This gasket is so placed that one wall 15 abuts the lead holder 13, and its wide wall 16 presents an inclined plane to certain joint material to be described. To obviate excessive flexing of the pointed end of the gasket 14, a metallic reinforcing (which may be in the form of several wires 17, as shown), is used. Adjacent the gasket 14 a V-shaped rubber gasket 18 is placed, with the point of the V inserted into the narrowing space between wall 16 of gasket 14 and the surface 19 of the bell. Primarily to insure uniformity of dimensions for the gaskets 14, 18, and hence uniformly effective sealing with standardized joint materials, the surface 19 is machined, a tool clearance 20 being left at the bottom of the bell.

To drive the V-shaped gasket home, a second wedge ring is used, said wedge ring being composed of an annular series of metallic wedges 21 (Figs. 7, 8 and 9) encased in a lead ring 22 which is generally similar to ring 13, and is locked to the wedges by the provision of lateral and longitudinal grooves 23, 23ª in the wedges. The lead ring 22 fits over a steel sleeve 24 (to be described). To fill the joint space surrounding and above lead ring 22, additional lead 25 is poured in after the assembly of the other parts of the joint. The poured lead 25 and the preformed ring 22 fill the entire space between the gasket 14 and the end of the bell, as shown in Fig. 1; and because of a locking groove 25ª in the bell, the lead is securely held. The assembly of the joint is now complete, and the mandrel 6 is withdrawn.

When the joint is to be completed in the field, the spigot is thrust into the bell (the joint materials thereof being as shown in Fig. 1), until its end abuts the shoulder 10. Then by means of a calking tool (not shown), the mass of lead 25 is pushed inwardly, leaving an annular fin 26 adjacent the spigot, and thrusting gasket 18 tightly against gasket 14. Because of the inclined wall 16, and the V-shape of gasket 18, the two gaskets are very tightly compressed against the spigot and the inside of the bell. The ends of wedges 21 provide a solid core for the pointed end of flexible gasket 18 and prevent it from collapsing as it is thrust home.

Figure 2:
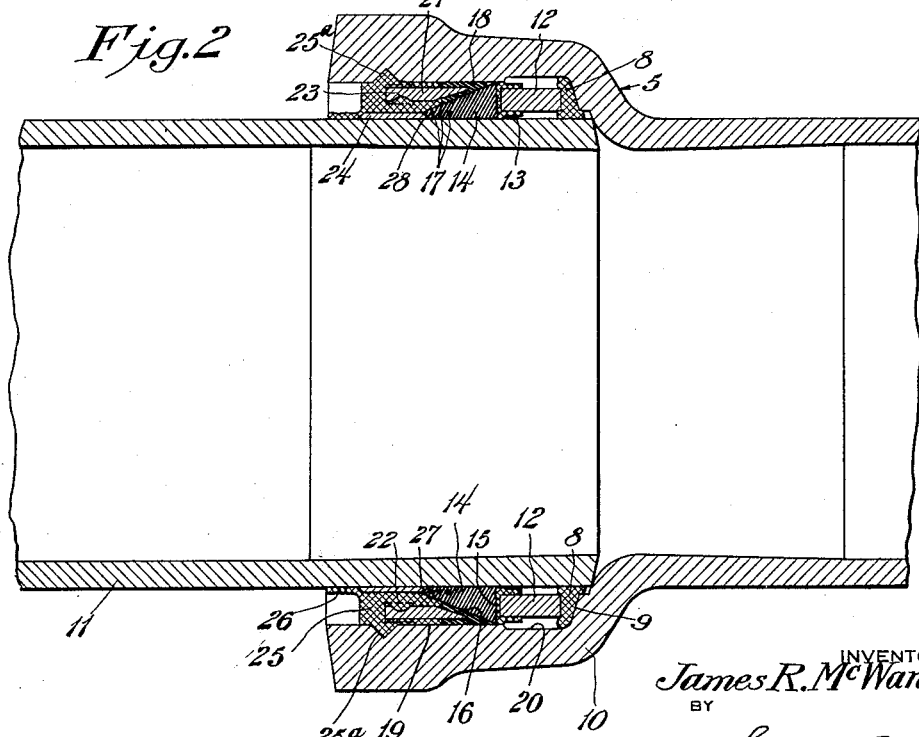
Fig. 2 is a diametric section of the completed pipe joint.

It will be understood that the lead enters groove 25ª at the time it is poured, and the subsequent calking so compresses the lead that it is locked by the groove even after being moved into the joint space, as shown in Fig. 2.

The final calking serves to lock and seal the steel sleeve 24. If desired the space left after the final calking may be filled with more lead, but this is not necessary, and hence is not shown in the drawings.

The steel sleeve 24 plays an important part both in assembling the joint and after assembly. It is usually difficult to position any rubber gasket perfectly and still more difficult, when inserting the spigot, to prevent its fouling against any projecting element. To obviate any such fouling, the pointed end of gasket 14 has a beveled inner surface 27 just wide enough for contact with the sleeve 24, which may or may not have a beveled surface 28, depending on the thickness of the sleeve. Thus the sleeve 24 will prevent the pointed end of gasket 14 from projecting into the path of the spigot, and will actually guide or center the spigot. The reinforcing means 17 so stiffens the pointed end of the gasket 14 that it is not distorted by the thrust of the steel sleeve, or the entrance of the V gasket and wedges.

Another advantage of the sleeve is that it permits sliding of the spigot, whether from thermal expansion or from other causes, without leakage of the joint. It has been found that if the sleeve is used, the spigot may move in and out of the bell without leakage, while without the sleeve, very small movements of the spigot will cause a leak. The sleeve is smooth on the inner surface, though not necessarily machined, and fits over the smooth surface of the spigot. If the spigot is cast iron, as is preferred, its surface will be smoothed by an emery wheel or other means to enable the sleeve to fit closely and slide freely over the spigot.

The described pipe joint is best made up at the factory, to save time and labor in the field and to realize the advantages of specially trained labor working under the most favorable conditions. When so made, the pipe joint is completed without any difficulty, the spigot being easily thrust home without danger of fouling on the joint materials. When the final calking is done, a wedging action takes place on the rubber gaskets, which causes them to become very tight without much movement of said gaskets and without great distortion of their original form. Thus the final calking is reduced to a minimum consistent with an absolutely tight joint. However, if sliding takes place, the sleeve permits it, without disturbance of the calked lead, which is important if the pressure is to be held.

The described joint is not only tight; it is also long lived. The rubber gaskets are sealed by the lead rings both from the atmosphere, which oxidizes rubber, and from the gas, which may rot the rubber by a chemical action. Further advantages are the absence of any bolts, which may rust out, and the provision of a flexible expansion joint to take the place of welded or other rigid constructions.

In my companion application, Serial No. 341,407, now issued as Patent No. 1,824,560, dated September 22, 1931, there is described and claimed a pipe joint employing a plastic parting substance in lieu of the above-described sleeve 24. This application is generic with respect to the aforesaid patented invention.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A pipe joint for gas pipe and the like comprising, in combination, a bell; a spigot inserted in the bell; a packing ring at the bottom of the bell and in contact with the end of the spigot; a flexible ring consisting of a series of metallic blocks in a holder, having the ends of the blocks abutted against the packing ring; a pair of rubber gaskets inserted in the joint space adjacent the block holder; one of the gaskets being generally triangular in cross-section, and placed so that its point is toward the top of the bell, and the other gasket being generally V-shaped in cross-section with its point presented in the direction of the bottom of the bell; calking material in the joint space adapted to force the rubber gaskets closer together by a wedging action; and a rigid sleeve interposed between the calking material and the spigot and designed to facilitate sliding of the spigot for some distance out of the bell without leakage of the joint.

2. A pipe joint for gas pipe and the like comprising, in combination, a bell having a locking groove near its mouth; a spigot inserted in the bell; a packing ring at the bottom of the bell and in contact with the end of the spigot; a flexible ring consisting of a series of metallic blocks in a holder, having the ends of the blocks abutted against the packing ring; a pair of rubber gaskets inserted in the joint space adjacent the block holder; one of the gaskets being generally triangular in cross-section, and placed so that its point is toward the top of the bell, and the other gasket being generally V-shaped in cross-section with its point presented in the direction of the bottom of the bell; a second flexible ring comprising a series of wedges extending into the V-shaped gasket and constituting a solid core for the same; the triangular gasket also being reinforced; calking material filling the space between the gaskets and the mouth of the bell; and a metallic sleeve interposed between the calking material and the spigot and serving as a guide for the spigot during assembly and also facilitating sliding of the spigot.

3. A pipe joint particularly designed for high pressure gas lines and the like comprising, in combination, a packing for the bottom of the bell; a pair of rubber gaskets in the joint room constructed like wedges so that as they move toward each other they fit more tightly against the spigot and bell; calking lead beyond the gaskets; means formed on the bell for locking the calking lead so that, after calking, the gaskets are held against displacement; and a rigid sleeve adjacent the calking lead fitting closely over the spigot and in contact with one of the gaskets to prevent fouling of the spigot when thrust home and to allow movement of the spigot without leakage.

4. A bell and spigot pipe joint comprising, in combination, joint sealing materials in the bottom and intermediate portions of the bell, calked and locked in place by other packing material; and a rigid sleeve interposed between the locking material and the spigot and closely fitting the spigot to prevent movement of the locking material with the spigot and to permit longitudinal sliding of the spigot in the bell, both before and after assembly and calking of the joint.

5. A bell and spigot pipe joint comprising, in combination, a pair of rubber packing rings juxtaposed to each other and so constructed and arranged that movement of the rings toward each other tightens the seal effected by the rings; a flexible ring and joint sealing material at the bottom of the bell; said sealing material sealing the rubber rings against the gas in the interior of the pipe; said flexible ring transmitting thrusts from said sealing material to the rubber rings and vice versa when the spigot is deflected; and joint sealing material locked with the bell near the top and calked in position for holding the rubber rings against displacement.

6. A bell and spigot pipe joint comprising, in combination, a pair of rubber packing rings juxtaposed to each other and so constructed and arranged that movement of the rings toward each other tightens the seal effected by the rings; joint sealing material at the bottom of the bell for sealing the rubber rings against the interior of the pipe; other joint sealing material locked with the bell near the top and calked in position for holding the rubber rings against displacement; and a sleeve having a smooth interior fitting snugly over the spigot, and permitting the spigot to slide therein without movement of the sealing material which is locked with the bell, one of the rubber rings having a beveled surface at the end which is directed toward the top of the bell, and the sleeve fitting over the beveled surface of the rubber ring so as to obviate fouling of the spigot on the rubber ring when the spigot is thrust home.

7. A bell and spigot pipe joint comprising, in combination, a pair of rubber packing rings juxtaposed to each other and so constructed and arranged that movement of the rings toward each other tightens the seal effected by the rings; joint sealing material at the bottom of the bell for sealing the rubber rings against the interior of the pipe; other joint sealing material locked with the bell near the top and calked in position for holding the rubber rings against displacement; and a metallic sleeve having a smooth interior fitting snugly over the spigot, and permitting the spigot to slide therein without movement of the sealing material which is locked with the bell, one of the rubber rings having a beveled surface at the end which is directed toward the top of the bell, and being reinforced near said beveled surface, and the sleeve having a complementary beveled surface fitting over the beveled surface of the rubber ring so as to obviate fouling of the spigot on the rubber ring when the spigot is thrust home.

8. A bell and spigot pipe joint comprising, in combination, joint sealing material at the bottom of the bell; a rubber gasket at an intermediate point in the bell and held against movement in the direction of said joint sealing material; lead calked in the bell and holding the rubber gasket against outward movement; a metallic cylindrical sleeve in close contact with the spigot and locked in place by the lead; said sleeve engaging with the gasket to prevent the spigot from fouling on the gasket during assembly.

9. A bell and spigot pipe joint comprising, in combination, a ring of flexibly connected blocks at the bottom of the bell; a rubber gasket at an intermediate point in the joint and held against movement toward the bottom of the bell by said ring of blocks; lead calked in the bell and holding the rubber gasket against outward movement; a ring of metallic wedges also held by said lead; the gasket being V-shaped and the ends of the wedges entering the space between the wings of the gasket to provide a metallic core for the gasket; and a rubber packing ring having one surface presenting an inclined plane over which the gasket moves when the joint is tightened by calking, whereby said gasket is tightened against the inner surface of the bell.

10. A bell and spigot pipe joint comprising, in combination, a ring of blocks flexibly connected together by a ring of lead; said blocks having their free ends adjacent the bottom of the bell; said ring of lead being tightly compressed against both the bell and the spigot to provide a seal; a V-shaped rubber gasket at an intermediate point in the joint and held against movement toward the bottom of the bell by said blocks; a ring of wedges whose ends project into the space between the wings of the V-shaped rubber gasket; and lead calked in and interlocked with the bell at the top thereof and holding the aforesaid joint materials tightly compressed in the joint.

11. A bell and spigot pipe joint comprising, in combination, a ring of blocks flexibly connected together by a ring of lead; said blocks having their free ends adjacent the bottom of the bell; said ring of lead being tightly compressed against both the bell and the spigot to provide a seal; a V-shaped rubber gasket at an intermediate point in the joint and held against movement toward the bottom of the bell by said blocks; a ring of metallic wedges whose pointed ends project into and substantially fill the space between the wings of the V-shaped rubber gasket; a rubber packing ring interposed between and in contact with the V-shaped gasket, the aforesaid ring of lead and the spigot, said packing ring having an outer frusto-conical surface serving as an inclined plane to cause a wedging action when said V-shaped gasket is moved toward the bottom of the bell; and lead calked in the bell at the top thereof and holding the aforesaid joint materials tightly compressed in the joint.

12. A bell and spigot pipe joint comprising, in combination, a ring of blocks flexibly connected together by a ring of lead; said blocks having their free ends adjacent the bottom of the bell; said ring of lead being tightly compressed against both the bell and the spigot to provide a seal; a V-shaped rubber gasket at an intermediate point in the joint and held against movement toward the bottom of the bell by said blocks; a ring of metallic wedges whose ends project into the space between the wings of the V-shaped rubber gasket; a rubber packing ring interposed between and in contact with the V-shaped gasket and the aforesaid ring of lead and located between said gasket and the spigot and having an outer frusto-conical surface serving as an inclined plane to cause a wedging action when said gasket is moved toward the bottom of the bell; said rubber packing ring also having a pointed end which is directed toward the top of the bell and a metallic reinforcing embedded therein at the pointed end; and lead calked in the bell at the top thereof and holding the ring of metallic wedges and the gasket and packing ring tightly compressed in the joint.

13. A bell and spigot pipe joint comprising, in combination, a ring of blocks flexibly connected together by a ring of lead; said blocks having their free ends adjacent the bottom of the bell; said ring of lead being tightly compressed against both the bell and the spigot to provide a seal; a ring of metallic wedges; a rubber packing ring in contact with the aforesaid ring of lead and with the bell and the spigot; said rubber packing ring being generally triangular in cross-section with the pointed end directed toward the top of the bell, and having a beveled inner surface so that the pointed end is slightly spaced from the spigot; and lead calked to the bell at the top thereof and holding the ring of metallic wedges and the packing ring tightly compressed in the joint.

14. A bell and spigot pipe joint comprising, in combination, a ring of metallic blocks flexibly connected together by a ring of lead; said blocks having their free ends adjacent the bottom of the bell; said ring of lead being tightly compressed against both the bell and the spigot to provide a seal; a ring of metallic wedges held together by a lead ring having an excess of lead; a rubber packing ring interposed between the aforesaid ring of lead and the ring of metallic wedges, and in contact with the bell and the spigot at the end which is toward the bottom of the bell; and lead calked to the bell at the top thereof and holding the ring of metallic wedges and the gasket and packing ring tightly compressed on the joint; the excess lead in the lead ring aforesaid becoming amalgamated with the calked lead at the top of the bell during the calking process.

15. A bell and spigot pipe joint of the character described comprising, in combination, a calked primary seal at the bottom of the bell; an intermediate rubber gasket; a calked lead ring in the mouth of the bell; and parting means between said calked lead ring and the spigot and in direct sliding contact with the outside surface of the spigot to permit longitudinal movement of the spigot without disturbing the lead ring and ultimately causing leakage through the joint.

16. A bell and spigot joint for high pressure gas mains comprising, in combination, a compressed rubber gasket; a calked lead ring holding the gasket compressed; and annular parting means between the lead ring and rubber ring and in contact with the spigot to permit the spigot to move relative to the bell without causing leakage through the joint.

17. A bell and spigot pipe joint comprising joint packing material; and parting means surrounding the spigot and in direct contact with both the spigot and the joint packing material; said parting means being of such physical characteristics as to permit longitudinal movement of the spigot relative to the bell without injury to the packing material.

In testimony that I claim the foregoing as my own, I have hereto affixed my signature.

JAMES R. McWANE.